(12) United States Patent
Sugiyama et al.

(10) Patent No.: US 7,650,342 B2
(45) Date of Patent: Jan. 19, 2010

(54) USER PROFILE MANAGEMENT SYSTEM

(75) Inventors: Keiji Sugiyama, Kyoto (JP); Junichi Hirai, Osaka (JP); Akira Ishikawa, Nara (JP)

(73) Assignee: Panasonic Corporation, Osaka (JP)

( * ) Notice: Subject to any disclaimer, the term of this patent is extended or adjusted under 35 U.S.C. 154(b) by 455 days.

(21) Appl. No.: 11/628,952

(22) PCT Filed: Jun. 10, 2005

(86) PCT No.: PCT/JP2005/010658

§ 371 (c)(1),
(2), (4) Date: Dec. 8, 2006

(87) PCT Pub. No.: WO2005/122013

PCT Pub. Date: Dec. 22, 2005

(65) Prior Publication Data

US 2008/0301166 A1    Dec. 4, 2008

(30) Foreign Application Priority Data

Jun. 10, 2004  (JP) ............................. 2004-172030

(51) Int. Cl.
*G06F 7/00*  (2006.01)
(52) U.S. Cl. .............. 707/10; 707/1; 707/100; 707/101; 707/102; 707/104.1; 705/1; 705/26; 705/34; 705/37; 705/46
(58) Field of Classification Search .......... 707/1, 707/10, 100–102, 104.1; 705/1, 26, 34, 37, 705/46
See application file for complete search history.

(56) References Cited

U.S. PATENT DOCUMENTS 5,715,371 A * 2/1998 Ahamed et al. ............... 706/10

(Continued)

FOREIGN PATENT DOCUMENTS

JP    2001-188992    7/2001

(Continued)

OTHER PUBLICATIONS

"A New Intrusion Detection Method based on Process Profiling"—Yoshinori Okazaki and Izuru Sato—IEEE—2002—Applications and the Internet Jan. 28-Feb. 1, 2002 (pp. 82-90).*

(Continued)

*Primary Examiner*—Jean B. Fleurantin
*Assistant Examiner*—Anh Ly
(74) *Attorney, Agent, or Firm*—Wenderoth, Lind & Ponack, L.L.P.

(57) ABSTRACT

A management device that provides user profile taking the user's situation into consideration. The management device creates, in response to a request from applications, a new user profile (hereinafter referred to as "comprehensive user profile") based on a plurality of user profiles, and provides it to the applications. The management device always monitors a user's situation, directly or indirectly correlates the user's situation at the time that the user profile is registered with the user profile, and stores the same. Because the management device creates the comprehensive user profile based on the user profile corresponding to the current user situation, the comprehensive user profile reflects the user's situation which changes from time to time.

7 Claims, 22 Drawing Sheets

U.S. PATENT DOCUMENTS

| | | | |
|---|---|---|---|
| 5,978,766 A * | 11/1999 | Luciw | 705/1 |
| 6,510,430 B1 * | 1/2003 | Oberwager et al. | 707/10 |
| 6,691,106 B1 * | 2/2004 | Sathyanarayan | 707/3 |
| 7,216,119 B1 * | 5/2007 | LaPalme | 707/3 |
| 7,283,803 B2 * | 10/2007 | Karaoguz et al. | 455/406 |
| 7,505,921 B1 * | 3/2009 | Lukas et al. | 705/26 |
| 2001/0029183 A1 | 10/2001 | Ito | |
| 2001/0056405 A1 * | 12/2001 | Muyres et al. | 705/52 |
| 2002/0002483 A1 * | 1/2002 | Siegel et al. | 705/10 |
| 2002/0059201 A1 * | 5/2002 | Work | 707/3 |
| 2002/0059584 A1 * | 5/2002 | Ferman et al. | 725/34 |
| 2002/0065802 A1 * | 5/2002 | Uchiyama | 707/1 |
| 2002/0091994 A1 * | 7/2002 | McCready et al. | 717/124 |
| 2003/0093217 A1 * | 5/2003 | Petzold et al. | 701/201 |
| 2003/0206710 A1 * | 11/2003 | Ferman et al. | 386/46 |
| 2004/0054572 A1 * | 3/2004 | Oldale et al. | 705/10 |
| 2004/0205394 A1 * | 10/2004 | Plutowski | 714/21 |
| 2004/0247748 A1 * | 12/2004 | Bronkema | 426/106 |
| 2004/0254957 A1 * | 12/2004 | Hyotyniemi et al. | 707/104.1 |
| 2005/0021398 A1 * | 1/2005 | McCleskey et al. | 705/14 |
| 2005/0021666 A1 * | 1/2005 | Dinnage et al. | 709/217 |
| 2005/0136947 A1 * | 6/2005 | Llombart-Juan et al. | 455/456.3 |
| 2005/0222895 A1 * | 10/2005 | Jakobson et al. | 705/10 |
| 2005/0233728 A1 * | 10/2005 | Karaoguz et al. | 455/406 |
| 2005/0278421 A1 * | 12/2005 | Simpson et al. | 709/203 |
| 2006/0069635 A1 * | 3/2006 | Ram et al. | 705/37 |
| 2007/0016476 A1 * | 1/2007 | Hoffberg et al. | 705/14 |
| 2007/0061023 A1 * | 3/2007 | Hoffberg et al. | 700/83 |
| 2007/0233839 A1 * | 10/2007 | Gaos | 709/223 |

FOREIGN PATENT DOCUMENTS

| | | |
|---|---|---|
| JP | 2001-290727 | 10/2001 |
| JP | 2002-117066 | 4/2002 |
| JP | 2003-122786 | 4/2003 |
| JP | 2003-122992 | 4/2003 |
| JP | 2003-526824 | 9/2003 |
| WO | 99/44159 | 9/1999 |

OTHER PUBLICATIONS

"An Experiment in building profiles in information filtering: The Role of Context of User relevance Feedback"—Luz M. Quiroga and Javed Mostafa—Information Science and Informatics, Dec. 7, 2001 (pp. 671-694).*

"Integrating development of task and object models"—Mary Beth Rosson—Communications of the ACM, vol. 42, issue 1, Jan. 1999, (pp. 49-56).*

* cited by examiner

| User situation | Related situation | Relevance level |
|---|---|---|
| Commuting | At work | high |
| | Break | low |
| | At home | N/A |
| At work | Commuting | high |
| | Meeting | high |

*Fig. 3*

| Time/date | User situation | Use application |
|---|---|---|
| 2004/2/3 13:00 | At work | Word |
| 2004/2/3 15:00 | | Web browser |
| 2004/2/3 17:00 | | |
| 2004/2/3 19:00 | Commuting | |
| 2004/2/3 21:00 | At home | Video viewer |

*Fig. 4*

| Data | | Updated time/date | Importance level |
|---|---|---|---|
| IT-related | New product | 2004/2/3 13:50 | high |
| | Technology trend | 2004/2/3 13:50 | high |
| AV-related | New product | 2004/2/4 15:40 | low |
| | Matsushita | 2004/2/2 16:55 | low |
| Foreign-music related | New release info. | 2003/2/3 22:00 | high |
| | Live info. | 2004/2/4 23:55 | low |
| | Ranking info. | 2004/2/4 23:00 | high |
| Ski-related | Snow info. | 2004/2/2 22:00 | low |

| User situation | Data | | Importance level |
|---|---|---|---|
| At work | IT-related | New product | high |
| | | Technology trend | high |
| | AV-related | New product | low |
| | | Matsushita | low |
| On holiday | Foreign-music related | New release info. | high |
| | | Live information | low |
| | | Ranking info. | high |
| | Ski-related | Snow info. | low |

Fig. 6

| Working situation | Data | | Importance level |
|---|---|---|---|
| At work | IT-related | New product | high |
| | | Technology trend | high |
| | AV-related | New product | low |
| | | Matsushita | low |
| On holiday | Foreign-music related | New release info. | high |
| | | Live info. | low |
| | | Ranking info. | high |
| | Ski-related | Snow info. | low |

*Fig. 7A*

| Data | | Importance level |
|---|---|---|
| IT-related | New product | high |
| | Technology trend | high |
| AV-related | New product | middle |
| | Matsushita | middle |
| Foreign-music related | New release info. | middle |
| | Live info. | low |
| | Ranking info. | middle |
| Ski-related | Snow info. | low |

*Fig. 7B*

| Application | Data | | Updated time/date | Importance level |
|---|---|---|---|---|
| Web browser | IT-related | New product | 2004/2/3 13:50 | high |
| | | Technology trend | 2004/2/3 13:50 | high |
| | AV-related | New product | 2004/2/4 15:40 | low |
| | | Matsushita | 2004/2/2 16:55 | low |
| IM | Foreign-music related | New release info. | 2003/2/3 22:00 | high |
| | | Live info. | 2004/2/4 23:55 | low |
| | | Ranking info. | 2004/2/4 23:00 | high |
| | Ski-related | Snow info. | 2004/2/2 22:00 | low |

| Application | Data | | Updated time/date | Importance level |
|---|---|---|---|---|
| Web browser | IT-related | New product | 2004/2/3 13:50 | high |
| | | Technology trend | 2004/2/3 13:50 | high |
| | AV-related | New product | 2004/2/4 15:40 | low |
| | | Matsushita | 2004/2/2 16:55 | low |
| IM | Foreign-music related | New release info. | 2003/2/3 22:00 | high |
| | | Live info. | 2004/2/4 23:55 | low |
| | | Ranking info. | 2004/2/4 23:00 | high |
| | Ski-related | Snow info. | 2004/2/2 22:00 | low |

Extract → Weighting

Fig. 11B

| Data | | Updated time/date | Importance level |
|---|---|---|---|
| IT-related | New product | 2004/2/3 13:50 | high |
| | Technology trend | 2004/2/3 13:50 | high |
| AV-related | New product | 2004/2/4 15:40 | middle |
| | Matsushita | 2004/2/2 16:55 | middle |

| User situation | Related situation | Relevance level |
|---|---|---|
| During meal | At work | low |
| | Commuting | low |
| | At home | high |
| | Break | high |

| Time/date | User situation | Use application |
|---|---|---|
| 2004/2/3 13:00 | At work | Web browser(PC) |
| 2004/2/3 15:00 | | |
| 2004/2/3 17:00 | | |
| 2004/2/3 19:00 | At home | Media player |
| 2004/2/4 07:00 | During meal | Web browser (PC) |

| User situation | Data | | Importance level |
|---|---|---|---|
| At work | AV-related | New product | low |
| | | Matsushita | low |
| During holiday | Foreign-music related | Ranking info. | high |
| | Ski-related | Snow info. | low |

*Fig. 15A*

```
<Preference update="2004_2_3 17:00">
  <Category name="IT-related">
    <Data name="New product" importance="high"/>
    <Data name="Technology trend" importance="high"/>
  </Category>
</Preference>
```

*Fig. 15B*

| User situation | Data | | Importance level |
|---|---|---|---|
| At work | IT-related | New product | high |
| | | Technology trend | high |
| | AV-related | New product | low |
| | | Matsushita | low |
| During holiday | Foreign-music related | Ranking info. | high |
| | Ski-related | Snow info. | low |

*Fig. 15C*

```
Category, Name, Importance level, Updated time/date
Foreign-music related, New release info, high, 2003/02/03 19:00
Foreign-music related, Live info., low, 2003/02/03 19:00
```

*Fig. 15D*

| User situation | Data | | Importance level |
|---|---|---|---|
| At work | IT-related | New product | high |
| | | Technology trend | high |
| | AV-related | New product | low |
| | | Matsushita | low |
| During holiday | Foreign-music related | Ranking info. | high |
| | Ski-related | Snow info. | low |
| At home | Foreign-music related | New release info. | high |
| | | Live info. | low |

| User situation | Data | | Importance level |
|---|---|---|---|
| At work | IT-related | New product | high |
| | | Technology trend | high |
| | AV-related | New product | low |
| | | Matsushita | low |
| Break | Foreign-music related | Ranking info. | high |
| | Ski-related | Snow info. | low |
| At work | Foreign-music related | New release info. | high |
| | | Live info. | low |

At work : relevance level "low"
Break : relevance level "high"
At home : relevance level "high"

Fig. 16B

| User situation | Data | | Importance level |
|---|---|---|---|
| At work | IT-related | New product | middle |
| | | Technology trend | middle |
| | AV-related | New product | low |
| | | Matsushita | low |
| Break | Foreign-music related | Ranking info. | high |
| | Ski-related | Snow info. | middle |
| At home | Foreign-music related | New release info. | high |
| | | Live info. | middle |

Fig. 16C

| Data | | Importance level |
|---|---|---|
| Foreign-music related | New release info. | high |
| | Live info. | middle |
| | Ranking info. | high |
| Ski-related | Snow info. | middle |
| IT-related | New product | middle |
| | Technology trend | middle |
| AV-related | New product | low |
| | Matsushita | low |

```
<Preference update="2004_2_4 07:00">

<Category name="Foreign-music related">
    <Data name="New release information" importance="high"/>
    <Data name="Live information" importance="middle"/>
    <Data name="Ranking information" importance="high"/>
  </Category>
  <Category name="Ski information">
    <Data name="Snow information" importance="middle"/>
  </Category>

<Category name="IT-related">
    <Data name="New product" importance="middle"/>
    <Data name="Technology trend" importance="middle"/>
  </Category>
  <Category name="AV-related">
    <Data name="New product" importance="low"/>
    <Data name="Matsushita" importance="low"/>
  </Category>

</Preference>
```

Fig. 17

|User situation|Related situation|Relevance level|
|---|---|---|
|Commuting|At work|high|
||On the way home|low|
||At home|low|

|Time/date|User situation|Use application|
|---|---|---|
|2004/2/3 13:00|At work|IM|
|2004/2/3 15:00||Web browser(PC)|
|2004/2/3 17:00|On the way home||
|2004/2/3 19:00|At home|IM|
|2004/2/4 07:00|Commuting|Mobile phone text messaging application|

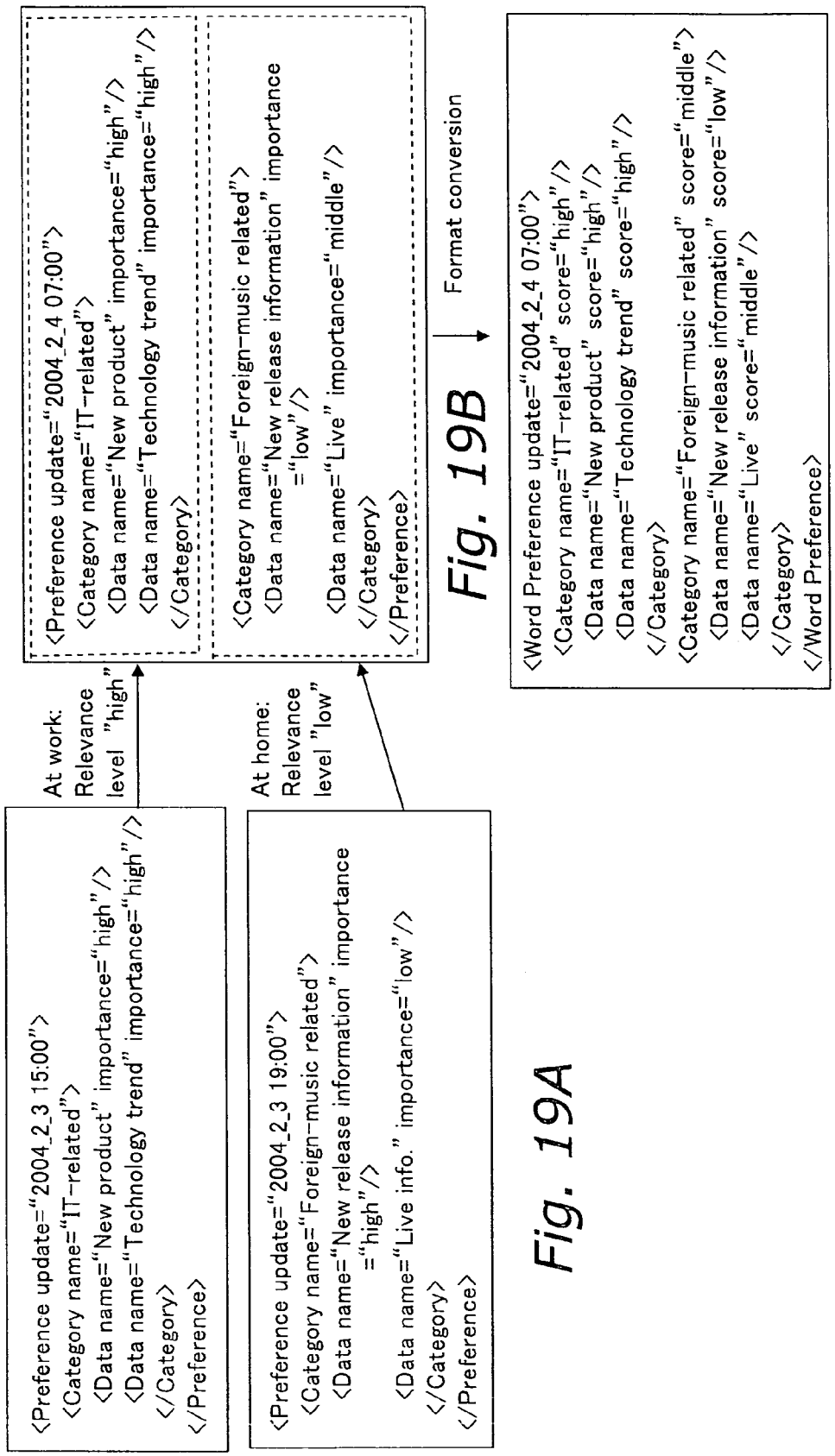

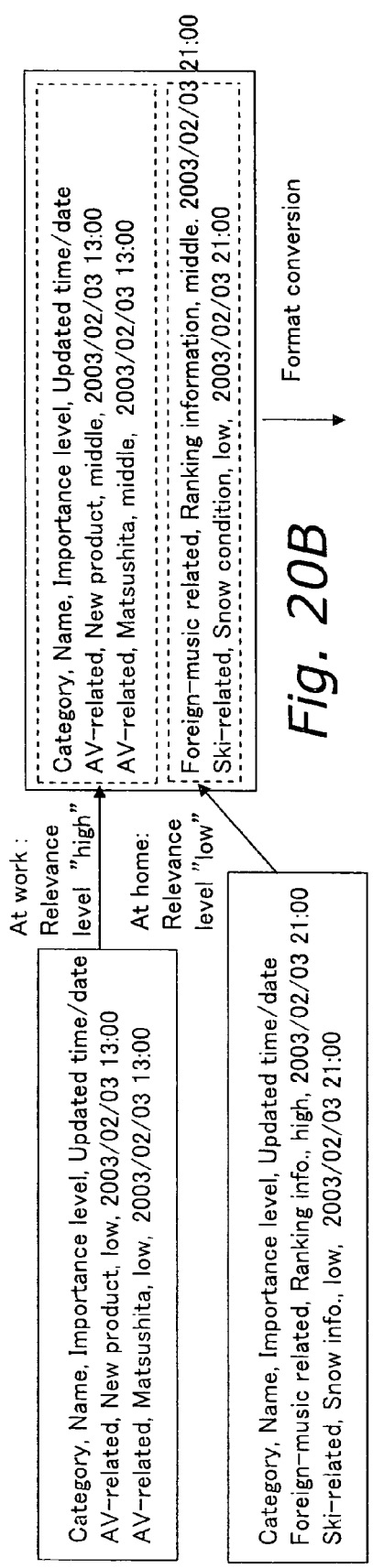

```
<Word Preference update="2004_2_4 07:00">
  <Category name="IT-related" score="high"/>
    <Data name="New product" score="high"/>
    <Data name="Technology trend" score="high"/>
  </Category>
  <Category name="AV-related" score="middle"/>
    <Data name="New product" score="middle"/>
    <Data name="Matsushita" score="middle"/>
  </Category>

<Category name="Foreign-music related" score="middle">
    <Data name="New release information" score="low"/>
    <Data name="Live" score="middle"/>
    <Data name="Ranking information" score="middle"/>
  </Category>
  <Category name="Ski-related" score="low">
    <Data name="Snow information" importance="low"/>
  </Category>
</Word Preference>
```

| Situation | Related situation | Relevance level |
|---|---|---|
| Commuting | At work | high |
| | On the way home | low |
| | At home | low |

| Time/date | Situation | Use application |
|---|---|---|
| 2004/2/3 13:00 | At work | Web browser (PC) |
| 2004/2/3 15:00 | | |
| 2004/2/3 17:00 | On the way home | |
| 2004/2/3 19:00 | At home | Mailer |
| 2004/2/4 07:00 | Commuting | Car navigation |

Fig. 22B

```
<owl:Class rdf:ID="IT-related">
  <rdfs:seeAlso xml:lang="ja" rdf:resource="#Information technology"/>
  <rdfs:seeAlso xml:lang="ja" rdf:resource="#Internet Technology"/>
</owl:Class>

<owl:Class rdf:ID="Music">
  <rdfs:seeAlso xml:lang="ja" rdf:resource="#Music"/>
</owl:Class>

<owl:Class rdf:ID="Foreign music">
  <rdfs:subClassOf rdf:resource="#Music"/>
</owl:Class>
```

```
<Word Preference update="2004_2_3 21:00">
<Category name="Information technology" score
="middle">
<Data name="New Product" score="middle"/>
<Data name="Technology" score="middle"/>
</Category>
<Category name="Music" score="middle">
<Data name="Ranking" score="middle"/>
</Category></Word Preference>
```

At home :
Relevance level
"low"

Ontology
translation

Fig. 24B

```
<Word Preference update="2004_2_4 21:00">
<Category name="IT-related" score="low"/>
<Data name="New product" score="low"/>
<Data name="Technology trend" score="low"/>
</Category>
<Category name="Music" score="low">
<Data name="Ranking information" score
="low"/>
</Category></Word Preference>
```

Format conversion →

Fig. 24C

```
<Preference update="2004_2_4 07:00">
<Category name="IT-related">
<Data name="New product" importance="low"/>
<Data name="Technology trend" importance="low"/>
</Category>

<Category name="Music">
<Data name="Ranking information" importance="low"/>
</Category>
</Preference>
```

USER PROFILE MANAGEMENT SYSTEM

FIELD OF THE INVENTION

The present invention relates to technology for creating user profiles.

DESCRIPTION OF THE RELATED ART

Recently, personalized services such as e-commerce and portal services, in which a service is customized and provided for each user, have become popular. In these services, information on a user's preferences and so on is analyzed based on the activity history of the user in a given service site, and a user profile is created and stored. By using this user profile, a service is customized in a way that suits each user. Also, in the information appliance field, more and more functions are now provided in which information on users' preferences is obtained from information such as program viewing history, and is stored as user profiles. By using these user profiles, information appliances can customize the functions provided for each user.

However, a problem arising from such situations is that user profiles are decentralized on each service server or appliance. As a result, it is difficult to use a user profile created in one service for other services or appliances. In order to solve this problem, Patent Document 1 provides a system and method for building user profiles in which user profiles created on a plurality of servers are integrated on a central server and provided to different servers as necessary. In this system, a user profile created by one service server for a user can be used by other service servers, thus improving the quality of personalized service.

A user profile will differ greatly depending on the situation of a user when the user profile is generated. For example, a user profile will inevitably differ when the user is at work and when the user is at home because the information that the user needs is different. In other words, a user profile is closely related to the situation in which that user profile is generated. Thus, a user profile created by ignoring the situation in which the user profile is generated lacks effectiveness and is difficult to use.

For example, what a user prioritizes when at work is different from what the user prioritizes during his/her holiday. When "at work", the user may give priority to and collect information relating to his/her work, for example, information relating to information technology. On the other hand, when on "holiday", the user may give priority to and collect information relating to his/her hobby or leisure activities, for example, information relating to music and travel. In this way, a user profile changes depending on the user's situation.

In Patent Document 1, however, a method is employed to consider how long content or a service is used, in which category that content or service is categorized, how often the content or service is used, etc. are monitored. In response to the monitoring result, a user profile collected from each server is weighted and merged. With this method, information about the time in which a user profile was created and the category of the content that the user was using may be utilized, but it is difficult to monitor a user's situation independent of applications or services and utilize it in order to manage a user profile.

Therefore, technology is desired in which a user's situation at the time that a user profile was created or updated is accurately monitored, and data concerning the user's situation is utilized in order to manage the user profile.

An object of the present invention is to provide technology whereby a user profile can be created by taking a user's situation at the time the user profile was created or used into consideration, and the created user profile can be utilized.

Patent Document 1: National Publication of International Patent Application No. 2003-526824

BRIEF DESCRIPTION OF DRAWINGS

FIG. 3 is a conceptual explanatory diagram of a relevance level data table stored in the knowledge DB.

FIG. 4 is a conceptual explanatory diagram of situation data stored in a situation data table.

FIG. 5 is a conceptual explanatory diagram of a user profile that the management device receives.

FIG. 6 is a conceptual explanatory diagram of information stored in a profile DB.

FIG. 7(a) shows a user profile corresponding to a related situation.

FIG. 7(b) shows a merged user profile.

FIG. 10 is a conceptual explanatory diagram of information stored in a profile DB of a management device in a second embodiment.

FIG. 11(a) shows a user profile before conversion.

FIG. 11(b) shows a user profile after conversion.

FIG. 14(a) shows a relevance level data table according to the first embodiment.

FIG. 14(b) shows a situation data table according to the first embodiment.

FIG. 15(a) shows a profile DB in an initial state (before 13:00, 2004/2/3).

FIG. 15(b) shows a user profile created by a web browser.

FIG. 15(c) shows the profile DB after storing the user profile shown in FIG. 15(b).

FIG. 15(d) shows a user profile created by a media player.

FIG. 15(e) shows the profile DB after storing the user profile shown in FIG. 15(d).

FIG. 16 shows an example of weighting and sorting a user profile based on relevance levels.

FIG. 17 shows a comprehensive user profile converted into a format that a web browser can use.

FIG. 18(a) shows a relevance level data table according to the second embodiment.

FIG. 18(b) shows a situation data table according to the second embodiment.

FIG. 19 shows a user profile created by a web browser in the second embodiment and a converted user profile, with (a) showing a user profile created by the web browser, (b) showing the user profile after being weighted and merged, and (c) showing the user profile after the format thereof is converted.

FIG. 20 shows a user profile created by an IM in the second embodiment and a converted user profile, with(a) showing a user profile created by the IM, (b) showing the user profile after being weighted and merged, and (c) showing the user profile after the format thereof is converted.

FIG. 21 shows a comprehensive user profile provided to a mobile phone text message.

FIG. 22(a) shows a relevance data table in a third embodiment.

FIG. 22(b) shows a situation data table in the third embodiment.

FIG. 22(c) shows an ontology file.

FIG. 24 shows a user profile created by a mailer in the third embodiment and a converted user profile, with(a) showing a user profile created by the mailer, (b) showing the user profile after being weighted and ontology-translated, and (c) showing the user profile after the format thereof is converted.

BRIEF SUMMARY OF THE INVENTION

Figure 1:
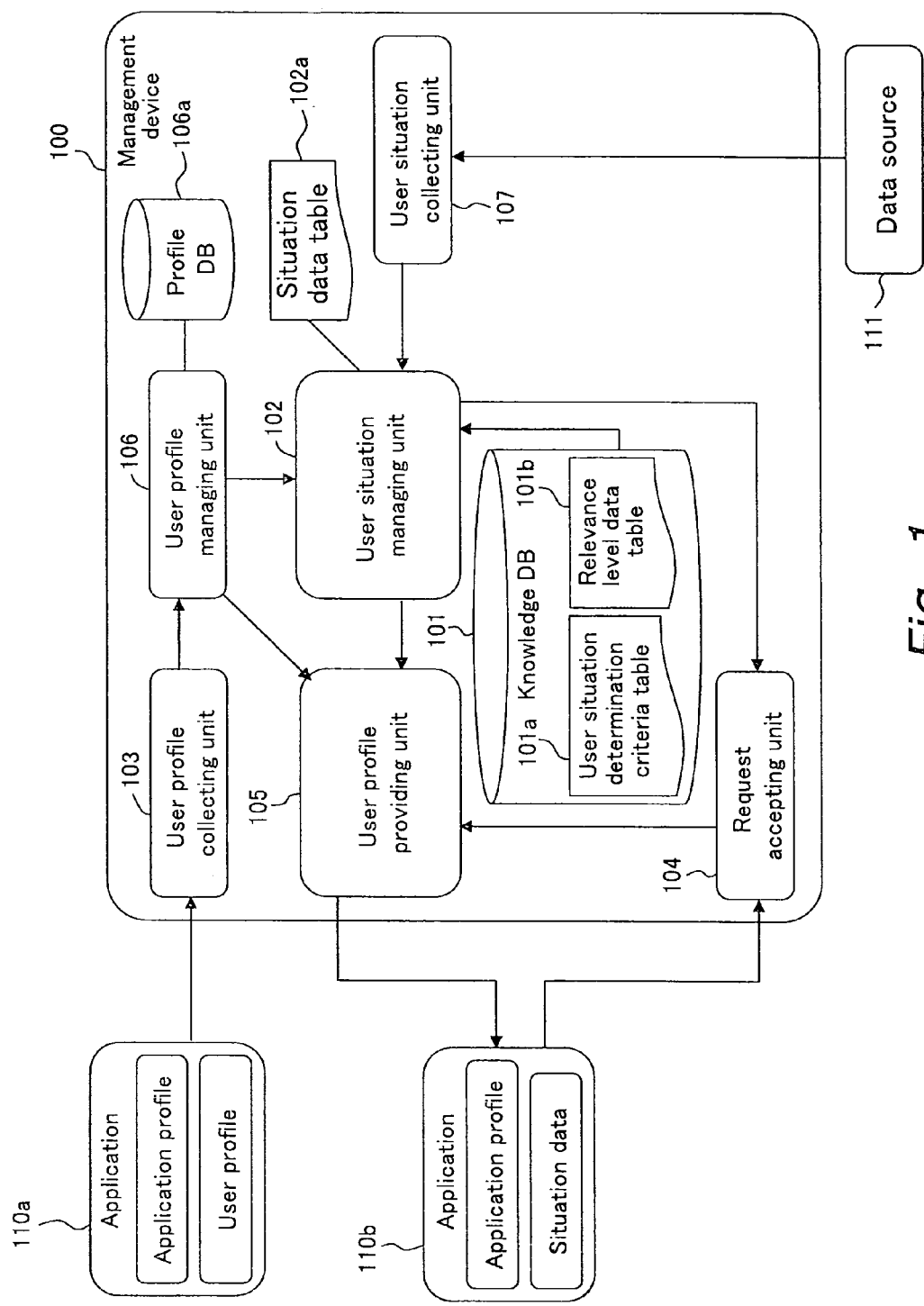
FIG. 1 shows the configuration of a user profile sharing system to which a management device according to a first embodiment of the present invention is applied.

In order to solve the aforementioned problem, a first aspect of the invention provides a management device for collecting user profiles from a user terminal, the management device being connected to the user terminal in which one or more applications operate. This device comprises the following means:
- determination criteria storing means for storing user situation determination criteria for determining a user situation;
- collecting means for collecting and storing user profiles created by the one or more applications;
- request accepting means for accepting a request for a user profile from any of the one or more applications;
- user situation managing means for determining, in response to the request, a current user situation based on the user situation determination criteria;
- creating means for extracting from the user profiles stored in the collecting means one or more user profiles relating to the current user situation and creating a comprehensive user profile of the current user situation based on the one or more extracted user profiles; and
- transmitting means for transmitting the comprehensive user profile created by the creating means to a requester.

Because the comprehensive user profile is created based on one or more user profiles relating to a situation at the time that the one or more user profiles were used, a highly usable comprehensive user profile can be provided.

A second aspect of the invention provides the management device according to the first aspect, wherein the user situation managing means further accepts registration of user situation determination criteria.

By registering the user's own situation determination criteria, the situation of each user can be accurately determined.

A third aspect of the invention provides the management device according to the first aspect, wherein every time the collecting means collects a user profile, the user situation managing means will determine the user situation at the time of collection based on the user situation determination criteria. In this device, the collecting means correlates the user situation determined by the user situation managing means with the collected user profiles and stores the same. The creating means extracts one or more user profiles corresponding to the current user situation and creates the comprehensive user profile based on the one or more extracted user profiles.

This management device correlates a user situation at the time of collecting a user profile with the user profiles and stores the same. Therefore, a user situation at the time that a user profile is requested, i.e., a user profile corresponding to the current user situation, can be easily extracted.

A fourth aspect of the invention provides the management device according to the first aspect, wherein the user situation managing means correlates predetermined user situations with predetermined link information and stores the same. In this device, the collecting means correlates the collected user profiles with the link information and stores the same. Also, the creating means extracts one or more user profiles using link information corresponding to the current user situation as a key, and creates the comprehensive user profile based on the one or more extracted user profiles.

Examples of the link information may be time information and an application identifier. The application identifier is information that identifies an application. When the link information is the time information, hours of the day and a user situation are correlated such as "9:00 to 17:00: at work", "17:00 to 19:00: commuting" and "19:00 to 7:00: at home". When the link information is the application identifier, hours of the day and the application identifier are correlated such as "9:00 to 17:00; web browser", "17:00 to 19:00: media player" and "19:00 to 7:00: instant messenger".

By correlating a user profile with collection time and storing the same, for example, a user situation at the time that the user profile is requested, i.e., a user profile corresponding to the current user situation, can be extracted based on the collection time. Specifically, if the current user situation is "at home", the user profile collected during 19:00 to 7:00 is extracted, and based thereon, a comprehensive user profile is provided to the requester.

In this way, even when a user profile is stored independently of a user situation, the user profile can be linked with the user situation by means of the link information.

A fifth aspect of the invention provides the management device according to the first aspect, wherein the user situation managing means stores a relevance level table that defines the relevance levels of a predetermined plurality of user situations. In this device, the creating means specifies, from the relevance level table, another user situation related to a current user situation (hereinafter referred to as "related user situation"), further extracts one or more user profiles relating to the related user situation in addition to one or more user profiles relating to the current user situation, and creates the comprehensive user profile based on the extracted user profiles.

Because a user profile of a user situation relating to a current user situation is further used, the comprehensive user profile becomes more useful. For example, let us assume that predetermined user situations are "at work", "commuting" and "at home". In this case, it can be assumed that the user situation "at work" and the user situation "commuting" are closely related. On the contrary, the user situations "at work" and "commuting" are not closely related to the user situation "at home". Such relevance levels of user situations are defined in the relevance level table. Not only is a user profile directly corresponding to the current user situation used, but a related user profile is also used, and therefore a more flexible and useful comprehensive user profile can be created.

A sixth aspect of the invention provides the management device according to the fifth aspect, wherein the creating means weights the extracted user profiles based on a relevance level between the current user situation and the related user situation, and creates the comprehensive user profile based on each weighted user profile.

A comprehensive user profile more suitable for a current user situation can be created by weighting a user profile corresponding to a related user situation in accordance with the relevance level between the current user situation and the related user situation.

A seventh aspect of the invention provides the management device according to the first aspect, wherein the request accepting means receives, together with the request for a user profile, the format of the user profile that the application can interpret. In this device, the creating means transmits the created comprehensive user profile after converting the format thereof into a format that the application can interpret.

For example, the description language in the comprehensive user profile and the tag name in a user profile are converted into a format according to each application. An ontology file maybe used for the conversion. In this way, a user profile can be shared between any application.

An eighth aspect of the invention provides a management method for collecting user profiles from a user terminal, the management method executed by a computer being connected to the user terminal in which one or more applications operate. This method includes the following steps:
- a determination criteria storing step of storing user situation determination criteria for determining a user situation;
- a collecting step of collecting and storing user profiles created by the one or more applications;
- a request accepting step of accepting a request for a user profile from any of the one or more applications;
- a user situation managing step of determining a current user situation based on the user situation determination criteria in response to the request;
- a creating step of extracting one or more user profiles from the stored user profiles relating to the current user situation, and creating a comprehensive user profile of the current user situation based on the one or more extracted user profiles; and
- a transmitting step of transmitting the comprehensive user profile created by creating step to a requester.

This invention has the same effects as the first aspect of the invention.

A ninth aspect of the invention provides a management program causing a computer terminal to function as a management device for collecting user profiles from a user terminal in which one or more applications operate, the management device being connected the user terminal. This program causes the computer terminal to function as the following means:
- determination criteria storing means for storing user situation determination criteria for determining a user situation;
- collecting means for collecting and storing user profiles created by the one or more applications;
- request accepting means for accepting a request for a user profile from any of the one or more applications;
- user situation managing means for determining a current user situation based on the user situation determination criteria in response to the request;
- creating means for extracting one or more user profiles from the stored user profiles relating to the current user situation, and creating a comprehensive user profile of the current user situation based on the one or more extracted user profiles; and
- transmitting means for transmitting the comprehensive user profile created by the creating means to a requestor.

This invention has the same effects as the first aspect of the invention.

The present invention makes it possible to create and provide a user profile that matches the situation of a user who is using the user profile.

DETAILED DESCRIPTION OF THE PRESENT INVENTION

Summary of the Invention

FIG. 1 shows a configuration of a user profile sharing system to which a management device according to a first embodiment of the present invention is applied.

The user profile sharing system comprises a management device 100, and one or more applications 110a and 110b.

The management device 100 creates a new user profile (hereinafter referred to as "comprehensive user profile") based on a plurality of user profiles in response to a request from an application 110. Prior to the creation of the comprehensive profile, each of the plurality of applications 110 creates a user profile and registers it in the management device 100. The management device 100 continuously monitors a user's situation, and directly or indirectly correlates the user's situation at the time that the user profile is registered with the user profile and stores the same. In order to create the comprehensive user profile, a user profile will be used that corresponds to a user situation when the user profile is requested, or a user situation specified by an application (hereinafter collectively referred to as "current user situation"). The user profile corresponding to the current user situation is a user profile that an application will create under the same user situation as the current user situation.

Because the management device 100 creates the comprehensive user profile based on the user profile corresponding to the current user situation, the comprehensive user profile can reflect the ever-changing user situation. Therefore, each application can perform processing suitable for the current user situation based on the comprehensive user profile. For example, take an example where the application is a web browser. When the current user situation is "at home", the application can perform processes such as searching web pages relating to the user's hobby. On the other hand, when the current user situation is "at work", the application can perform processes such as searching web pages that the user often uses for work.

In the present invention, a user profile is information relating to a user's preferences. Note, however, that the information that the user profile includes is not limited to the above. For example, the user profile may include a history of user movement, personal relationships, careers, etc. The user profile may also be a dictionary file to which a user adds a custom dictionary in a text editing application. Note that the format of the user profile is not specifically limited to a particular format.

First Embodiment

Embodiments of the present invention will now be described with reference to the accompanying drawings.

[Functional Configuration]
(1) Overall Configuration

FIG. 1 shows a configuration of a user profile sharing system to which a management device according to the first embodiment of the present invention is applied. The user profile sharing system includes a management device 100, one or more applications 110a and 110b, and a data source 111. The applications 110 operate on a computer terminal such as a personal computer, mobile phone, PDA (Personal Digital Assistant) and GPS, and communicate with the management device 100 via a network such as the Internet and LAN.

Note that the applications 110 may exchange data with the management device 100 via a recording medium such as an SD card, CF card and DVD.

In addition to performing processing unique to the applications, the applications 110 create user profiles and provide the created user profiles to the management device 100. Also, the applications 110 request and obtain user profiles from the management device 100, and perform processing based on the obtained information. Examples of such applications may be a web browser, an instant messenger (hereinafter referred to as "IM") and a mailer.

The data source 111 is a device or an application for providing information relating to a user, and it provides basic information for determining a user situation to the management device 100. For example, the data source 111 may include a GPS device that a user possesses, a sensor set up at a given place such as a ticket gate and company meeting room, and a scheduler in which a user schedule is stored. In the present embodiment, it is assumed that the data source 111 exchanges data with the management device 100 via a network, however, the data source 111 may be on the same terminal as the management device 100.

(2) Management Device

The management device 100 includes the following elements (a) to (g).

(a) A Knowledge database (DB) 101 (corresponding to the determination criteria storing means) that stores user situation determination criteria for determining a user situation. Details of the user situation determination criteria will be explained later.

(b) A User situation managing unit 102 (corresponding to the user situation managing means) that determines an ever-changing user situation at any given time based on the information provided by the data source 111 and the user situation determination criteria. Also, it writes the determined user situation into a situation data table 102a.

(c) A User profile collecting unit 103 (corresponding to the collecting means) that collects applications from the applications 110. Further, it may accept registration of the user situation determination criteria from the user.

(d) A Request accepting unit 104 (corresponding to the request accepting means) that accepts a request for a user profile from the applications 110.

(e) A User profile providing unit 105 (corresponding to the creating means and transmitting means) that creates a user profile which matches a user situation at the time the user profile is requested (hereinafter referred to as "current user situation") based on the stored user profiles, and provides it to a requester of the user profile.

(f) A User profile managing unit 106 (corresponding to the collecting means) that stores the user profiles in a user profile DB 106a and reads them out therefrom. The user profile DB 106a correlates the user profiles created by the applications 110 with a user situation when the user profiles are created and store the same.

(g) A User situation collecting unit 107 that obtains information from the data source 111 and passes it to the user situation managing unit 102.

It is assumed that the management device 100 having the aforementioned elements is realized as a service providing device on a user's home server or a service server. Note that the management device 100 does not necessarily have to be mounted on a fixed computer terminal but may be realized as a service on a user's mobile terminal. Note that all the elements 101 to 107 of the management device 100 do not have to exist on the same computer terminal. Each element may be mounted on a different computer terminal as necessary. In such a case, the elements can preferably exchange data with each other by means of a data communication network such as a LAN and the Internet.

[Information that the management device stores]

Next, the information that the management device 100 stores will be explained.

(1) Knowledge DB (1-1) User situation determination criteria table

Figure 2:
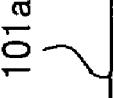
FIG. 2 is a conceptual explanatory diagram of a user situation determination criteria table stored in a knowledge DB.

FIG. 2 is a conceptual explanatory diagram of a user situation determination criteria table 101a stored in a knowledge DB 101. Determination criteria data is registered in the user situation determination criteria table 101a. The determination criteria data is used by the user situation managing unit 102 for determining a user situation. A default value of the determination criteria data may be set in the user situation determination criteria table 101a but preferably, the management device 100 accepts a registration from a user. Each user's situation can be determined accurately and in detail by each user's situation determination criteria data. In the following explanation, a case is considered where the determination criteria data for each user is registered.

The determination criteria data correlates possible situations of the user with situation derivation data. In this example, "at work", "commuting" and "at home" are registered as the possible user situations. A user situation may be a value which can be uniquely identified in the management device 100, and may be expressed with an UUID or URI or may be a character string. A user can freely set the value of each user situation.

Information collectable by the data resource 111 or time information detectable by the management device 100 may be used as the situation derivation data, which is correlated with each user situation. In this example, "hours of the day" of each user situation, "position information" of a user at any given time, and "terminal used" and "application used" are shown as the situation derivation data. "Hours of the day", "position information", "terminal used" and "application used" do not all have to be used. It is only necessary to use at least one of them. Also, the situation derivation data is not limited to the aforementioned examples.

A specific example of how a user situation is determined by the user situation determination criteria table 101a shown in FIG. 2 will be explained below. For example, assume that "position information: Kadoma", "terminal used: laptop PC" and "application used: web browser" at 08:30, which is indicated by an internal clock of the management device 100, are collected from the data source 111. In this case, it is determined that the user situation is "at work". It is also possible to determine that the user situation is "at work" based only on the internal clock time of the management device 100, "08:30". Further, it may also be possible to assign a priority level to each situation derivation data, and when the user situation that each situation derivation data indicates does not agree, the user situation may be determined based on the situation derivation data which is assigned a high priority level.

(1-2) Relevance level data table

FIG. 3 is a conceptual explanatory diagram of a relevance level data table 101b stored in the knowledge DB 101. Relevance level data is registered in the relevance level data table. The relevance level data defines relevance levels between the user situations registered in the user situation determination criteria table 101a. The provider of the management device 100 may set the relevance level data, but the management device 100 may instead accept a setting from a user. Preferably, the user registers the relevance level between each user situation included in the determination criteria data by him/herself. A case where the relevance level data for each user is registered will be considered below. In FIG. 3, for example, it is set that a user situation "at work" has a high relevance level to the user situation "commuting", and the user situation "break" has a low relevance level. It is also set that the user situation "at home" has no relevance thereto.

The relevance data is used for extracting a user profile created in a related situation from the user profile DB 106a. The related situation is another user situation relating to a current user situation. As mentioned above, the current user situation is the user situation when the applications 110 request a user profile. Flexibility and usability of a comprehensive user profile will be enhanced by creating the comprehensive user profile based not only on the user profile created in the current situation but also on the user profile created in the related situation.

(2) Situation data table

FIG. 4 is a conceptual explanatory diagram of situation data stored in the situation data table 102a. The situation data table 102a is preferably created for each user. The user situations determined by the user situation managing unit 102 based on information from the determination criteria data and the data source 111 are sequentially written into the situation data table 102. The situation data includes a user situation and additional information relating to the user situation. An example shown in FIG. 4 indicates that the user situation is "at work" from 13:00 to 19:00 on 2004/2/3, "commuting" from 19:00 to 21:00 and "at home" after 21:00. As the additional information, time/date and the application that a user is using at that time/date are stored. Note, however, that the additional information is not limited to the aforementioned examples. Information collectable from the data source 111 can be included in the situation data as the additional information. For example, position information and schedule information may be the other additional information. By including the additional information in the situation data, a user situation can be determined based on the additional information.

The situation data is used in order to determine which user situation a user profile created by the applications 110 corresponds to, or for determining the current user situation.

(3) Profile DB

Next, a user profile stored in the profile DB 106a will be explained. FIG. 5 is a conceptual explanatory diagram of a user profile that the management device 100 receives. The user profile at least includes data. In this example, it further includes an updated time/date and importance level. The "importance level" indicates a user's interest level for a certain category. The "updated time/date" indicates the time/date data when the importance level is updated.

FIG. 6 is a conceptual explanatory diagram of information stored in the profile DB 106a. In this embodiment, when receiving a user profile shown in FIG. 5, the management device 100 correlates the user situation at the time that the user profile is received with the user profile, and stores the same. FIG. 6 shows that IT-related and AV-related user profiles were received during "at work", and foreign-music related and ski-related user profiles were received while "on holiday". The user situation at the time that the user profile is received and the user profile are correlated because the user situation at the time that the user profile is received is substantially the same as the user situation at the time that user profile was created, which is equivalent to correlating the user situation at the time the user profile is created with the user profile.

[Function]

Next, functions of the management device 100 will be explained. The management device 100 mainly has three functions, i.e., (1) obtaining a user situation, (2) obtaining a comprehensive user profile, and (3) providing the comprehensive user profile. Each of these functions will be explained below.

(1) Obtaining a user situation

The management device 100 collects information from the data source 111, and determines the user situation at the time of collection based on the collected information and the determination criteria data. The determined user situation is written into the situation data table 102a.

First, the user situation collecting unit 107 collects user information from the data source 111. Examples of the user information that the data source 111 provides may be time information, position information, schedule information, nearby store information, nearby user information and application information that a user is using. User identification for identifying a user may also be included in the user information. The collected information is passed to the user situation managing unit 102 from the user situation collecting unit 107. Well-known means such as a mailer and an instant messenger (IM) may be used as the user situation collecting unit 107.

The user situation managing unit 102 compares the collected user information and the situation derivation data of the determination criteria data, and determines the user situation at the time of collection. Further, the user situation managing unit 102 determines situation data based on the format of the situation data table 102. The determined user situation is written into the situation data table 102a. For example, let us assume that "time information: 9:00 on 2004/4/2" and "web browser" are collected when the format of the determination criteria data shown in FIG. 2 and the format of the situation data table 102a shown in FIG. 4 are as given. Then, the user situation managing unit 102 determines based on the determination criteria data that the user situation is "at work". Further, the user situation managing unit 102 creates situation data including time/date of "9:00 on 2004/4/2", user situation of "at work", and application used of "web browser", and registers it in the situation data table 102a.

In this way, every time new user information is collected from the data source 111, new situation data is stored in the situation data table 102a based on the collected user information. The transition history of the user situation is thus stored in the situation data table 102a.

(2) Obtaining a user profile

The management device 100 obtains a user profile created by any of the user applications 110, correlates it with the user situation at the time that the user profile was obtained, and stores the.

First, how the user profile is obtained will be explained. The user profile collecting unit 103 of the management device 100 receives at a predetermined timing a user profile created or updated by any of the applications 110. At this time, the management device 100 receives creation/updated time information of the user profile and an application profile in which information about the application itself is written (hereinafter referred to as "application profile"), as well as the user profile. The user profile may include the time information. The application profile includes an identification of the application, the purpose for using the same, the usage environment such as an OS, the format of the user profile that can be used thereby, the terminal on which the application is executed, etc. The received user profile and application profile are passed to the user profile managing unit 106 from the user profile managing unit 103. Note that the user profile collecting unit 103 may have a function, such as authentication of an external application 110, which serves to maintain security.

Next, storing of a user profile is explained. The user profile managing unit 106 extracts from the received information data sufficient for identifying a user situation and passes it to the user situation managing unit 102. For example, the data to be extracted may be the identification of the application and the time information. The user situation managing unit 102 extracts corresponding situation data from the situation data table 102a based on the passed data and returns it to the user profile managing unit 106. The user profile managing unit 106 at least correlates a user situation among the returned situation data with the user profile, and stores it in the profile DB 106a.

A user profile and a user situation are thus correlated and stored in the profile DB 106a. Note that there are cases where a plurality of user situations are correlated to one user profile.

(3) Providing a comprehensive user profile

Next, how a comprehensive user profile is provided to the applications 110 is explained. In response to a request from any application 110, the management device 100 creates the comprehensive user profile according to a user situation at the time of request and provides it to the requester.

(3-1) Receiving a request

First, the request accepting unit 104 of the management device 100 receives an application profile of the application itself from any application 110 at a predetermined timing. A situation data may be received together with the application profile.

(3-2) Specifying situation data including a current user situation

The request accepting unit 104 analyzes the data received from the application 110. When the received data includes situation data, the request accepting unit 104 passes the situation data and the application profile to the user profile providing unit 105. This is because the comprehensive user profile may be created on the assumption that the user situation included in the received situation data is the current user situation.

When the specification of user situation is not received from the application 110, the request accepting unit 104 inquires about the current user situation to the user situation managing unit 102. The user situation managing unit 102 extracts the latest situation data from the situation data table 102a and returns it to the request accepting unit 104. When receiving the situation data, the request accepting unit 104 passes the received situation data and the application profile to the user profile providing unit 105. This is because a comprehensive user profile is created on the assumption that the user situation included in the latest situation data is the current user situation of the user.

(3-3) Specifying relevance level data including a related situation.

The user profile providing unit 105 specifies the user situation included in the situation data, and obtains from the user situation managing unit 102 relevance level data including a related situation of the specified user situation. The user profile providing unit 105 requests user profiles corresponding to the current user situation and the specified related situation from the user profile managing unit 106. The user profile managing unit 106 extracts the user profiles corresponding to the current user situation and the specified related situation from the profile DB 106a in response to the request and passes them to the user profile providing unit 105. Based on these, a comprehensive user profile is created.

For example, let us assume a case where user profiles shown in FIG. 6 are stored, and the current user situation is "commuting" and the related situations are "on holiday" and "at work". In this case, a user profile corresponding to "commuting" does not exist but user profiles corresponding to "at work" and "on holiday" do exist. Thus, the user profile managing unit 106 passes these to the profile providing unit 105.

(3-4) Converting a user profile (3-4-1) Conversion based on relevance level data The user profile providing unit 105 performs weighting on the obtained user profile using the relevance level data, and merges user profiles corresponding to the current user situation and the specified related situation.

FIG. 7 is an explanatory diagram showing one example how a user profile is weighted using the relevance level data. FIG. 7(a) shows user profiles corresponding to the related situations. FIG. 7(b) shows a merged user profile. In this figure, an example is taken where the relevance level data table 102a shown in FIG. 3 is given and the current user situation is "commuting". According to FIG. 3, other user situations relating to the user situation "commuting" are "at work" and "break". The relevance level of "at work" is "high" and "break" is "low". Then, the "importance level" of a user profile corresponding to the user situation "at work" is raised by weighting. Namely, the weighting is performed so that the level is raised from "low" to "middle" and "middle" to "high". Likewise, the "importance level" of a user profile corresponding to the user situation "break" is lowered by weighting. Namely, the weighting is performed so that the level is lowered from "high" to "middle" and "middle" to "low". As a result, the user profiles shown in FIG. 7(a) are merged as shown in FIG. 7(b).

Note, however, the calculation method of weighting a user profile in this example is just one example. Similarly, when creating a comprehensive user profile, the values of user profiles corresponding to the current user situation and a related situation may be changed based on the relevance level data.

(3-4-2) Converting the format

The user profile providing unit 105 converts the format of the merged user profile and creates a comprehensive user profile based on information described in the application profile. This is in order to convert the merged user profile into a format which can be used by the requester application 110. Subsequently, the user profile providing unit 105 transmits the comprehensive user profile to the requester application 110.

[Processing]

Next, an example of the processing performed by the profile sharing system will be explained with reference to the drawings.

(1) Processing for obtaining a user profile

Figure 8:
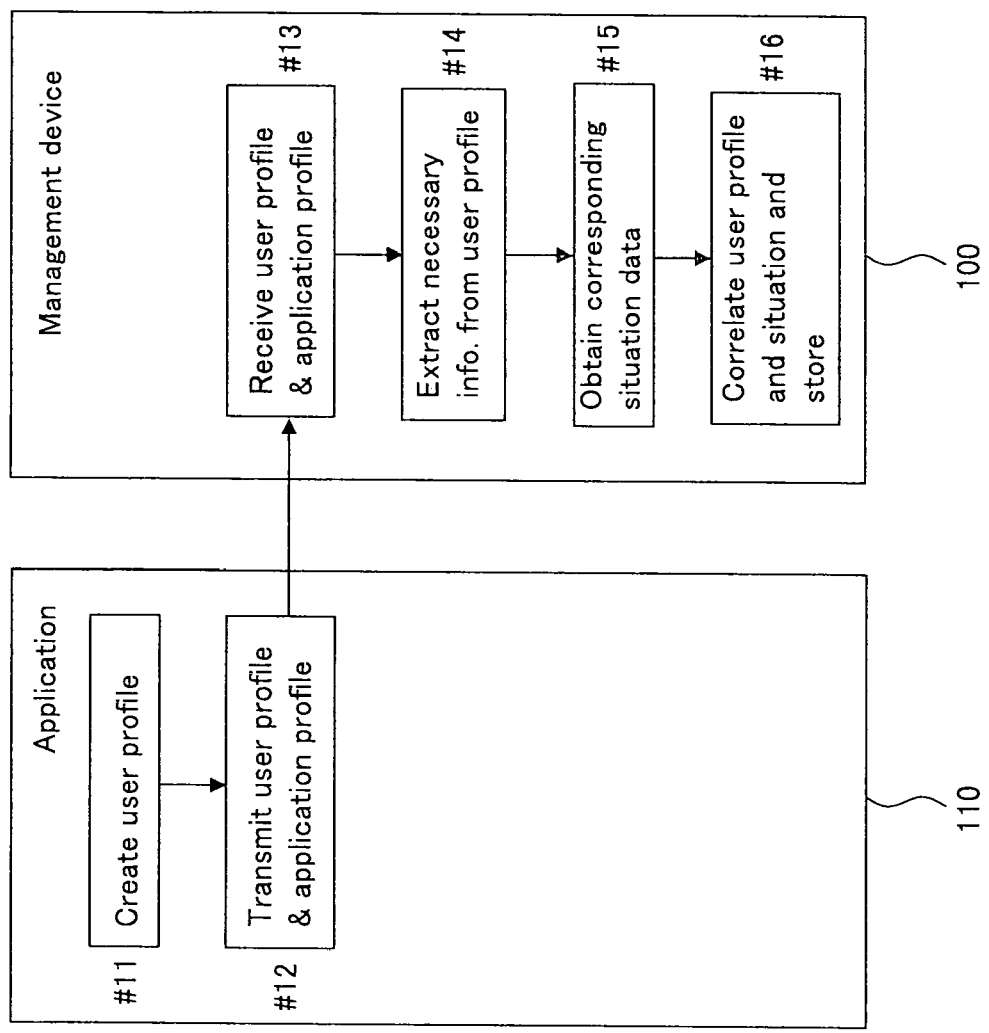
FIG. 8 is an explanatory diagram showing a processing example for obtaining a user profile.

FIG. 8 is an explanatory diagram showing a processing example for obtaining a user profile. First, an application 110 creates a user profile (#11) and transmits it with an application profile to the management device 100 (#12).

When the management device 100 receives the user profile and the application profile (#13), it extracts data for specifying the user situation at the time of receipt (#14). For example, the management device 100 extracts time information and an identifier of the application, and reads situation data including these from the situation data table 102a (#15). Finally, the management device 100 correlates the received user profile and at least the user situation in the situation data and stores it in the profile DB 106a (#16).

With the aforementioned processing, the received user profile and the user situation are directly correlated.

(2) Processing for providing a comprehensive user profile

Figure 9:
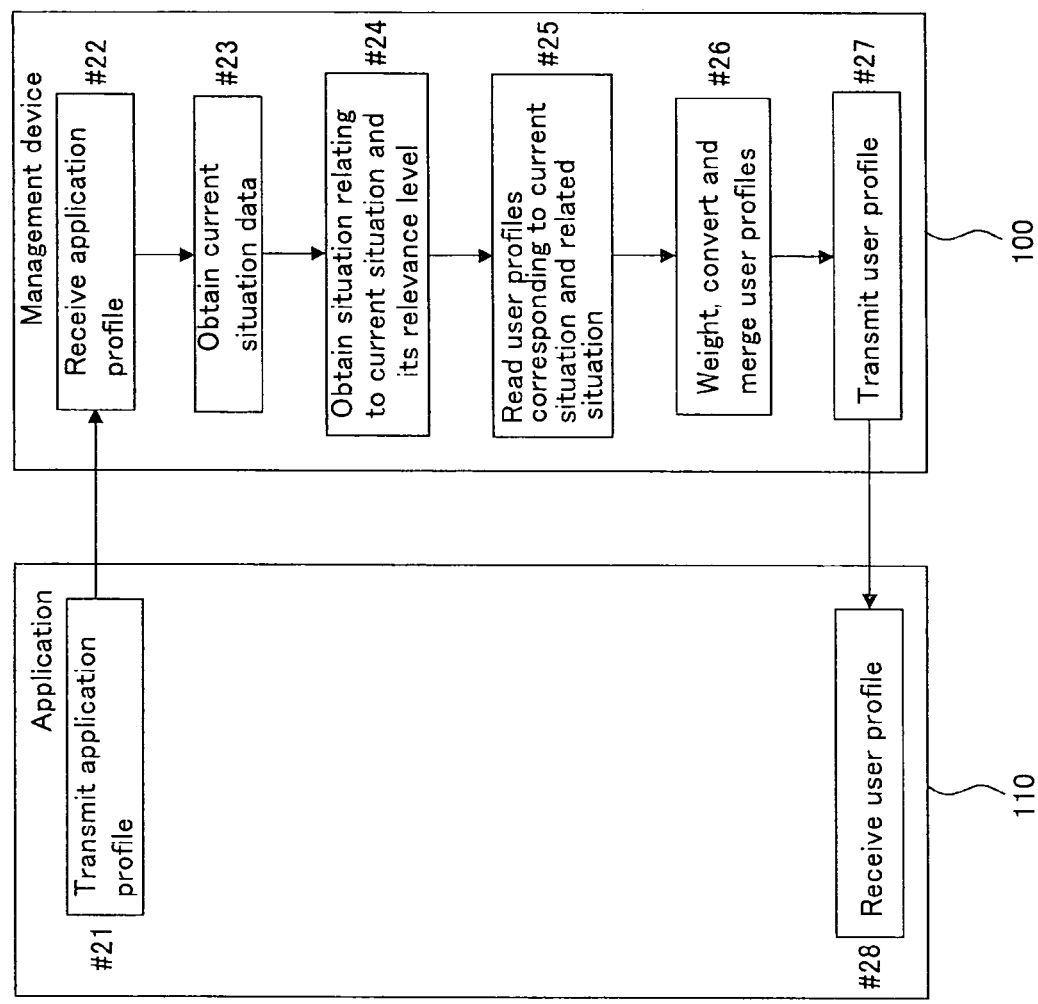
FIG. 9 is an explanatory diagram showing a processing example for providing a comprehensive user profile.

FIG. 9 is an explanatory diagram showing a processing example for providing a comprehensive user profile. First, an application 110 transmits a request for a user profile to the management device 100. At this time, the application 100 transmits an application profile with the request or instead of the request (#21).

When the management device 100 receives the application profile (#22), it specifies situation data including the current user situation (#23). Subsequently, the management device 100 specifies relevance level data including a related situation relating to the current user situation (#24). Further, the management device 100 reads the current user situation and the user profile corresponding to the current user situation from the profile DB 106a (#25), performs weighting and conversion, and creates a comprehensive user profile (#26). Finally, the management device 100 transmits the created comprehensive user profile to the requestor application 110 (#27, #28).

With the aforementioned processing, a comprehensive user profile can be created in accordance with a user situation at the time that an application requests a user profile, and thus a highly useful user profile can be provided.

[Effects]

According to this embodiment, user situation information can be sequentially monitored based on the user information collected by the management device 100, and the determination criteria data and the relevance level data stored in the knowledge DB 101. As a result, it becomes possible to correlate the user profile collected from the application 110 with the user situation at the time the user profile was created, and store the user profile. Also, a comprehensive user profile suitable for a situation in which the user profile is used can be established and provided by acquiring, based on relevance level data, a situation related (a related situation) to a situation in which a user profile requested by an application is used (a current user situation). Further, the user profile can be shared by different applications.

Second Embodiment

In the first embodiment, a user profile collected from the applications 110 is correlated to a user situation and is stored in the profile DB 106a, but the correlation of the user profile and the user situation may be performed at the time the comprehensive user profile is created.

[Stored information and functions]

The configuration of a user profile sharing system according to the second embodiment is the same as that of FIG. 1. However, the information stored in the profile DB 106a is different. The method of converting a user profile is also different. The features of the second embodiment that are different from the first embodiment will be explained below.

(1) Profile DB

FIG. 10 is a conceptual explanatory diagram of information stored in the profile DB 106a. In the profile DB 106a, collected user profiles are stored with link information correlated thereto. In this example, the user profile is stored for each application. The link information links a user situation in which the user profile is created with the user profile. Information used for the link information is not specifically limited, but the updated time/date and an application identifier may be used. Information included in the user profile may also be the link information.

(2) Specifying user profiles corresponding to a current user situation and a related situation FIG. 11 is an explanatory diagram showing how user profiles corresponding to a current situation and a related situation are specified by the user profile providing unit 105. FIG. 11(a) shows a user profile before conversion, and FIG. 11(b) shows a user profile after conversion using the specified user profiles. An example of the conversion is shown in a case where: the relevance level data table 101b shown in FIG. 3 and the situation data table shown in FIG. 4 are given; the current user situation is "commuting"; and the link information is time information.

In this example, among stored user profiles, only a user profile created in the user situations "at work" and "break", which relate to the current user situation "commuting", is the user profile corresponding to the web browser. This is acquired by comparing the updated date/time of the user profile and the situation data table 102a. Namely, the user profile updated during the time period corresponding to "at work" is the user profile corresponding to the web browser. No user profile updated during "break" is stored. Thus, only the user profile updated during 13:00 to 19:00, which is a time period corresponding to "at work", is extracted, and a merged user profile shown in FIG. 11(b) is obtained by changing the "importance level" in the user profile by weighting.

[Processing]

Next, an example of processing performed by the profile sharing system according to the second embodiment will be explained with reference to the drawings.

(1) Processing for obtaining a user profile

Figure 12:
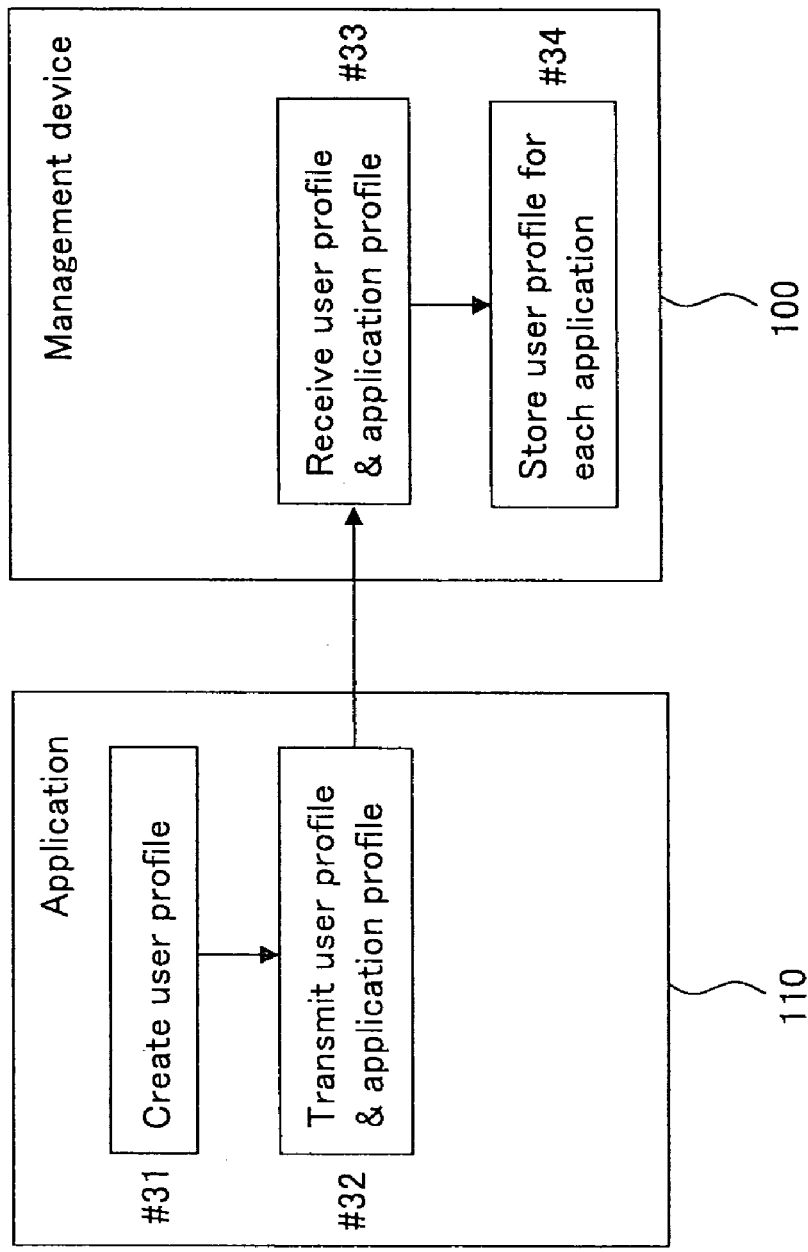
FIG. 12 is an explanatory diagram showing a processing example for acquiring a user profile according to the second embodiment.

FIG. 12 is an explanatory diagram showing a processing example for obtaining a user profile according to the second embodiment. First, an application 110 creates a user profile (#31) and transmits it with an application profile to the management device 100 (#32).

When the user profile collecting unit 103 of the management device 100 receives the user profile and the application profile (#33), it passes them to the user profile managing unit 106. The user profile managing unit 106 stores the user profile as is in the profile DB 106a if it includes link information (#34). If the user profile does not include link information, the user profile managing unit 106 correlates the user profile with the link information and stores the same. For example, the user profile managing unit 106 may correlate the user profile with the time information at the time of the receipt or an application identifier, and store the user profile.

With this processing, a user profile and link information can be correlated.

(2) Processing for providing a comprehensive user profile

Figure 13:
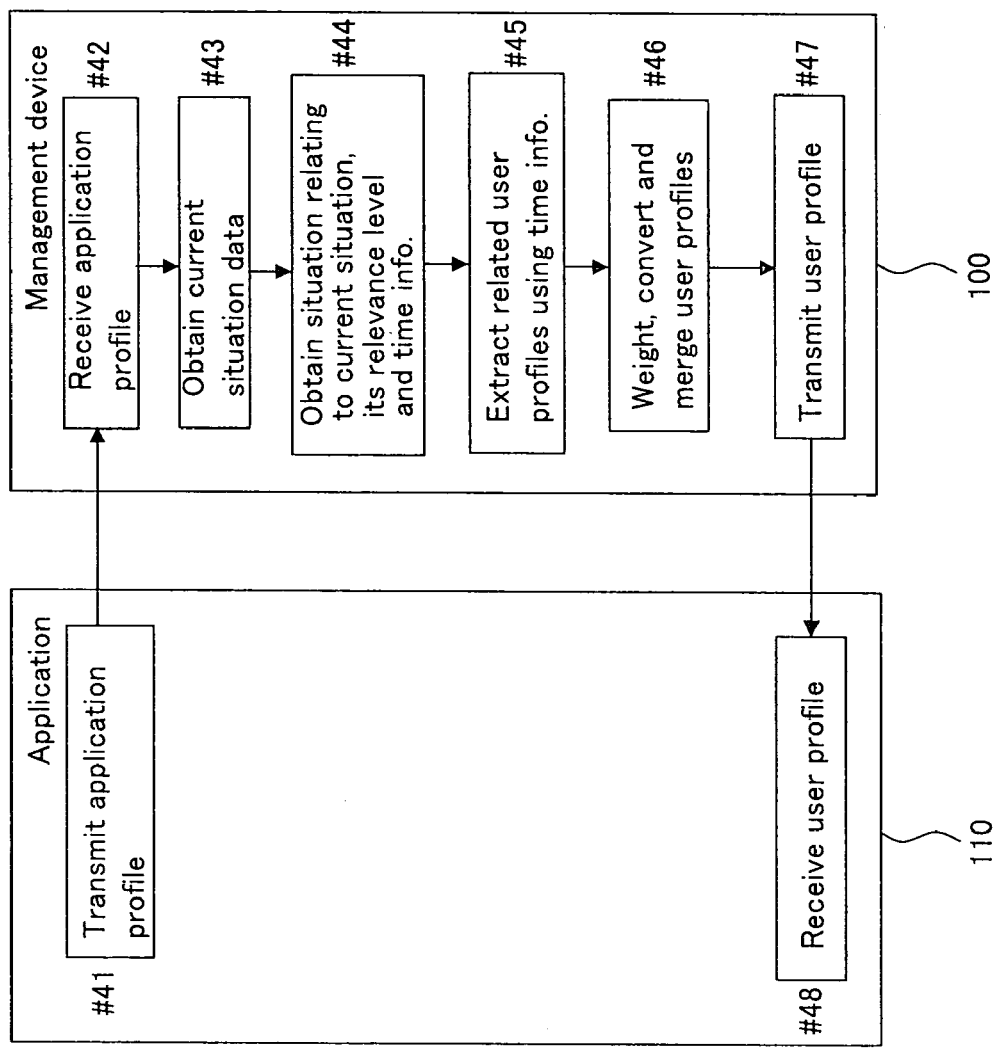
FIG. 13 is an explanatory diagram showing a processing example for providing a comprehensive user profile according to the second embodiment.

FIG. 13 is an explanatory diagram showing a processing example for providing a comprehensive user profile according to the second embodiment. First, the application 110 transmits a request for a user profile to the management device 100. At this time, the application 100 transmits an application profile with the request or instead of the request (#41).

When the management device 100 receives the application profile (#42), it specifies situation data including the current user situation (#43). Subsequently, the management device 100 specifies relevance level data including a related situation relating to the current user situation (#44). Further, link information is extracted from situation data, including the current user situation and situation data including the related situation (#44). For example, if the link information is time information, the time information is extracted.

Further, the user profile providing unit 105 of the management device extracts from the profile DB 106a user profiles corresponding to the current user situation and the related situation using the extracted link information (#45). Namely, the user profile corresponding to the current user situation or the related situation is searched by comparing the link information corresponding to the user profile and the link information extracted from the situation data. Subsequently, a comprehensive user profile is created based on the searched user profiles and is transmitted to the requestor (#46-#48)

With the aforementioned processing, a comprehensive user profile can be created which is suitable for a user situation at the time that the user profile is used, even when the user profile and the user situation are not stored without being directly correlated.

Third Embodiment

In the first embodiment, a merged profile is created by weighting a plurality of user profiles using the updated date/time and importance level included therein. However, even when the updated date/time and importance level are not included in the user profile, it is possible to perform the weighting. For example, the following methods are possible.
(a) A method in which the management device writes the time/date in when storing a user profile The user profile managing unit 106 correlates the time/date when a user profile is received with the user profile, and writes it in the profile DB 106a. When providing the user profile, the user profile managing unit 106 extracts user profiles corresponding to the current user situation or a related situation based on the stored time/date and the situation data table, and passes it to the user profile providing unit 105. Subsequently, the user profile providing unit 105 performs the weighting based on the relevance level data table.

Or, the user profile managing unit 106 determines a user situation to be correlated with the user profile based on the time/date when the user profile was received and the situation data table, correlates the user situation with the user profile and writes it into the profile DB 106a. The managing device 100 performs the weighting in the same way as the first embodiment when it receives a request for the user profile.
(b) A method in which the management device raises the importance level of a user profile corresponding to a user situation when a request for user profile is received For example, assume that a user profile and a user situation are correlated by the method explained in the aforementioned (a). The user profile providing unit 105 acquires a current user situation based on the time/date that the request for user profile is received, sets the importance level of the user profile corresponding to the current user situation to "high", and performs the weighting. For example, if the user situation at the time that the request for the user profile was received is "commuting", a merged user profile with the user profile for "commuting" being weighted will be created. In this way, it is not necessary that the user profile includes the updated time/date or the importance level, and in addition, the weighting is possible without the relevance level data table being used.
(c) A method in which the management device sets the importance level in accordance with the updated time/date of a user profile When the user profile includes the updated time/date, the user profile providing unit 105 may set the importance level based on that updated time/date. For example, the importance level may be set to "high" for a user profile for a week after a request is received, thereafter "middle" until one month has elapsed, and after one month may be set to "low". The user profile providing unit 105 performs the weighting based on the importance levels thus set and creates a merged user profile. In this way, it is not necessary that the user profile includes the updated time/date or the importance level, and in addition, the weighting becomes possible without the relevance level data table being used. This weighting method is also applicable to the aforementioned (a).

EXAMPLES

Next, the present invention will be specifically explained with examples.

First Example (1) The relevance level data table and the situation data table

FIG. 14(a) and FIG. 14(b) show the relevance level data table 101b and the situation data table 102a according to the first embodiment respectively. FIG. 14(a) shows relevance levels between "during meal", and "at work", "commuting", "at home" and "break". FIG. 14(b) shows that a user uses a web browser or a media player "at work", "at home" and "during meal". Here, the web browser and the media player are taken as examples for the applications 110a and 110b respectively. The web browser 110a creates a user profile about what kind of information the user is interested in based on a page access record, searched keywords, etc. The media player 110b creates a user profile about the user's preferences based on the content viewing history of the user.
(2) Processing Now, a processing example will be shown in which the web browser 110a and the media player 110b register user profiles in the management device 100, and the user profile in which the web browser 110a is registered is obtained.
(2-1) Obtaining and storing a user profile FIG. 15 is an explanatory diagram showing how a user profile is obtained and stored. User profiles created by the applications 110a and 110b are correlated with user situations and stored.

FIG. 15(a) shows the initial status of the profile DB 106a (before 13:00, February 3, 2004). Thereafter, the web browser 110a used by the user at work creates the user profile shown in FIG. 15 (b) after completion of its operation. In this example, the web browser creates the user profile in an XML (extensible Markup Language) format.

The user profile managing unit 106 of the management device 100 understands the format of the user profile created by the web browser based on the application profile, and extracts a portion of information which corresponds to the creation time and the user's preference based on the received user profile. Next, the user profile managing unit 106 passes the extracted creation time and the application profile to the user situation managing unit 102 and obtains corresponding situation data. In this example, the situation data corresponding to the creation time of the user profile shown in FIG.

15(b), i.e., "at work" is obtained, and the user profile managing unit correlates that situation data with the extracted user's preference and stores the same. FIG. 15(c) shows the result of the user's preference information extracted from the user profile of FIG. 15(b) being correlated with the user situation "at work" and stored in the profile DB 106a.

Next, the media player registers a user profile in the system. FIG. 15(d) shows the user profile created by the media player, having been used by the user at home, after completion of its operation. In this example, the media player creates the user profile in a CSV format. The created user profile is transmitted to the management device 100 with the application profile of the media player.

The user profile managing unit 106 of the management device 100 understands the format of the user profile created by the media player based on the application profile and extracts a portion of information which corresponds to the creation time of the user profile and the user's preference based on the received user profile. Next, the user profile managing unit 106 passes the extracted creation time and the application profile to the user situation managing unit 102 and obtains corresponding situation data. In this example, the situation data corresponding to the creation time of the user profile shown in FIG. 15(d), i.e., "at home" is obtained. The user profile managing unit 106 correlates that situation data with the extracted user's preference and stores it. FIG. 15(e) shows the result of the user's preference information extracted from the user profile of FIG. 15(d) being correlated with the user situation "home", and stored in the profile DB 106a.

Note that the user profile managing unit 106 does not have to correlate the preference information itself with the user situation but may correlate a pointer or a link to the preference information with the user situation.

Also, it has already been explained in the second embodiment that the user situation and the preference information may be correlated at the time that the user profile is provided but not at the time that the user profile is received.

(2-2) Providing a comprehensive user profile

Next, processing in which the web browser 110a obtains the user profile from the management device 100 will be explained.

The web browser 110a used by the user during mealtime transmits the application profile to the management device 100 at the start of its operation. The management device 100 that received the application profile reads situation data corresponding to the current user situation from the situation data table 102a by the user situation managing unit 102. Assume that the user situation data "during meals" is read out in this example.

Next, the user situation managing unit 102 transmits the read-out data to the user profile providing unit 105. The user profile providing unit 105 obtains situation data relating to "during meals" and the relevance level data from the user situation managing unit 102 and transmits them to the user profile providing unit 109.

The user profile providing unit 105 obtains a user profile corresponding to the situation data. For example, a user profile corresponding to "during meals", and a user profile corresponding to "at work", "commuting", "at home" and "break" which are the related situations of "during meals" are obtained from the user profile managing unit 106. In this example, the entire user profile shown in FIG. 15(e) is obtained.

Next, the user profile providing unit 105 performs the weighting, sorts the user profile correlated with each situation data based on the relevance level data of FIG. 14(a), and converts the sorted user profile into a format suitable for the web browser 110a. FIG. 16 shows an example of the weighting and sorting performed on the user profile based on the relevance levels. FIG. 17 shows the comprehensive user profile converted into the format that is usable by the web browser 110a. Subsequently, the user profile providing unit 105 transmits the created comprehensive user profile to the web browser 110a.

With the aforementioned processing, the web browser and the media player can share a user profile matching a user situation.

Second Example

Next, an example will be shown where an instant messenger (IM) and a mobile phone mailer, i.e., a mobile phone text messaging application, are used as the applications. The web browser 110a creates a user profile similar to that of the first example. The IM 110b and the mobile phone text messaging application 110c create user profiles about the user's preference based on a topic in which the user is interested, the history of exchanged files, etc.

(1) The relevance level data table and the situation sata table

FIG. 18(a) and FIG. 18(b) respectively show the relevance data table 101b and the situation data table 102a of the present example. FIG. 18(a) shows relevance levels between the user situations "commuting", "at work", "on the way home" and "at home". FIG. 18(b) shows that the user uses the web browser, IM, and mobile phone messaging application while "at work", "on the way home" and "commuting".

(2) Processing

Now, a processing example will be shown in which the web browser 110a and the IM 110b register user profiles in the management device 100, and the user profile in which the mobile phone messaging application 110c is registered is obtained.

(2-1) Obtaining and storing a user profile

First, the web browser 110a registers a user profile shown in FIG. 19(a) in the management device 100 in the same way as the first embodiment.

The user profile managing unit 106 of the managing device 100 stores the received user profile for each application. FIG. 19(a) shows that an IT-related profile created at work and a foreign-music related profile created at home are stored as user profiles created by the web browser 110a. The user profile creating unit 106 confirms that the user profiles are created by the web browser 110a based on the received application profile and stores the user profiles in a directory for the web browser and the like.

Next, the IM 110b that the user was using at work and at home creates a user profile for each situation after completion of its operation. FIG. 20(a) shows an example of the user profiles created by the IM. Here, the IM creates the user profile in the CSV format. The user profile managing unit 106 confirms that the user profiles are created by the IM based on a received application profile and stores the user profiles in a directory for IM and the like. Note that a user profile and situation data are not directly correlated in the present example.

(2-2) Providing a comprehensive user profile

Next, processing in which the mobile phone messaging application 110b obtains the user profile from the management device 100 will be explained. The mobile phone messaging application 110c used by the user during commuting transmits an application profile to the management device 100 at the start of its operation.

The request accepting unit 104 of the management device 100 that received the application profile obtains situation data corresponding to the current user situation from the user situation managing unit 102. In this example, situation data of the user, i.e. "commuting" is obtained. Next, the request accepting unit 104 passes the obtained situation data to the user profile providing unit 105.

The user profile providing unit 105 obtains situation data and relevance level data regarding "commuting" from the situation managing unit 102 and passes them to the user profile managing unit 106.

The user profile providing unit 105 obtains a user profile corresponding to the situation data from the user profile managing unit 106. In this example, the user profiles correlated with "at work", "on the way home" and "at home", which are the related situations of "commuting", are obtained from the user profile managing unit 106. Note, however, the user profile managing unit 106 uses the time data corresponding to the situation data as the link information and obtains the user profile stored for each application, because the user profile is not directly correlated with the situation data in this example.

Specifically, in order to obtain a user profile created while "at work", the user profile managing unit 106 searches the user profile created during "13:00 to 19:00 on 2004/2/3", which is a time period corresponding to "at work". At this time, an IT-related user profile from the user profiles of the web browser 110a and an AV-related user profile from the user profiles of the IM 110b are selected. Similarly, each user profile created during the time period corresponding to "on the way home" is selected and passed to the user profile providing unit 105.

Next, the user profile providing unit 105 performs the weighting on the user profile correlated to each situation data based on the relevance level data shown in FIG. 18(*a*) and merges user profiled at a for each application. FIG. 19(*b*) shows the user profile of the web browser 110a after being weighted and merged. FIG. 20(*b*) shows an example of the user profile of the IM 110b after being weighted and merged.

Further, the user profile providing unit 105 converts the merged user profile for each application into a format that can be used by an application that is requesting the user profile. FIG. 19(*c*) and FIG. 20(*c*) show examples in which the user profile for the web browser 110a and the user profile for the IM 110b are converted into a format that can be used by the mobile phone text messaging application.

Further, the user profile providing unit 105 provides a merged user profile to the mobile phone text messaging application 110c after merging these user profiles. FIG. 21 shows a comprehensive user profile created by merging the user profiles shown in FIG. 19(*c*) and FIG. 20(*c*).

Thus, the mobile phone text messaging application 110c can utilize the comprehensive user profile created by the web browser l110a and the IM 110c in accordance with the situation.

Third Example

Next, an example is shown where a web browser, mailer, and car navigation system are used as the applications 110.

The web browser 110a creates a user profile in a similar way to the first embodiment. The mailer creates, in a similar way to the web browser, a user profile about the user's preference based on a topic in which the user is interested, the history of files exchanged, etc.

(1) The relevance level data table, situation data table and ontology file

FIG. 22(*a*) and FIG. 22(*b*) respectively show the relevance data table 101b and the situation data table 102a of the present example. FIG. 22(*a*) shows relevance levels between user situations "at work", "on the way home", and "at home". FIG. 22(*b*) shows that the user uses the web browser, IM or car navigation system while "at work", "on the way home", "at home", and "commuting". The ontology file is used for translating a user profile.

(2) Processing

Now, a processing example will be shown in which the web browser 110a and the mailer 110b register user profiles in the management device 100, and the user profile in which the car navigation system 110c is registered is obtained.

(2-1) Obtaining and storing a user profile

First, the web browser 110a and the mailer 110b each creates a user profile and registers it with the management device 100. The user profile managing unit 106 stores the received user profile for each application. FIG. 23(*a*) and FIG. 24(*a*) are conceptual explanatory diagrams showing the user profile stored for each application. In the present example, a user profile and situation data are not directly correlated.

(2-2) Providing a comprehensive user profile

Next, processing in which the car navigation system 110c obtains the user profile from the management device 100 is explained.

The car navigation system 110c used by the user during commuting transmits an application profile to the management device 100 at the start of its operation.

The request accepting unit 104 of the management device 100 obtains situation data corresponding to the current user situation from the user situation managing unit 102. In this example, situation data of the user, i.e. "commuting" is obtained. Next, the obtained situation data is passed to the user situation managing unit 102 via the user profile providing unit 105.

The user situation managing unit 102 obtains situation data and relevance level data regarding "commuting" from the situation data table 102a and passes them to the user profile providing unit 105.

The user profile providing unit 105 obtains a user profile corresponding to the situation data from the user profile managing unit 106. In this example, the user profiles corresponding to "at work", "on the way home", and "at home", which are the related situations of "commuting", are obtained from the user profile managing unit 106. In the present example, the user profile and situation data are not directly correlated. Therefore, the user profile managing unit 106 uses the time data corresponding to the situation data as the link information and obtains the user profile stored for each application.

Specifically, the user profile managing unit 106 searches the user profile created during "13:00 to 19:00 on 2004/2/3", which is a time period corresponding to "at work", in order to obtain a user profile created while "at work". As a result, an IT-related user profile shown in the upper part of FIG. 23(*a*) is extracted. Similarly, a foreign-music related user profile shown in the bottom part of FIG. 23(*a*) is extracted as a user profile created during a time period corresponding to "on the way home". Also, a user profile for the mailer shown in FIG. 24 is extracted as a user profile created during a time period corresponding to "at home", and is passed to the user profile providing unit 105.

Figures 23A, 23B:
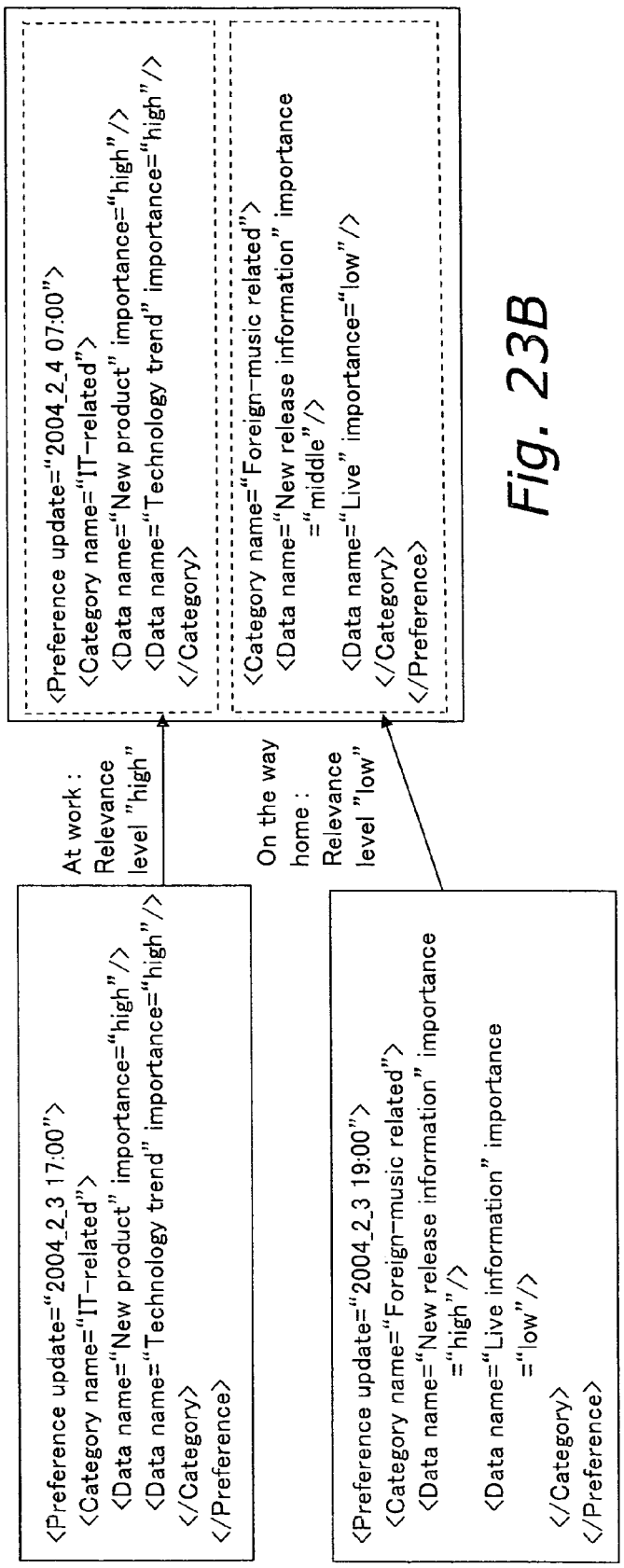
FIG. 23 shows a user profile created by a web browser in the third embodiment and a converted user profile, with(a) showing a user profile created by the web browser, and (b) showing the user profile after being weighted and merged.

Next, the user profile providing unit. 105 performs the weighting on the user profile correlated to each situation data based on the relevance level data, and merges user profile data for each application. FIG. 23(b) shows the two user profiles of the web browser after being weighted and merged.

Next, the user profile providing unit 105 converts the merged user profile for each application into a format that can be used by an application that is requesting the user profile. FIG. 24(c) shows an example that a user profile shown in FIG. 24(b) is converted into a format the car navigation 110c can use. In this example, it is assumed that the car navigation system 110c and the web browser 110a use the format of the same user profile. Therefore, the user profile of the web browser 110a is not converted but the user profile of the mailer 110b is converted into a format for the car navigation system 110c.

Here, when converting and merging the format of the user profile for an application, there may be a problem resulting from the different words being used. For example, the term "IT-related" is used in a profile of the web browser 110a shown in FIG. 23 whereas the term "Information Technology" is used in a profile of the mailer shown in FIG. 24. These terms have the same meaning, but unless otherwise specified, "IT-related" and "Information Technology" are treated as separate preference information, and thus their values cannot be merged. In order to solve the aforementioned problem, an ontology file shown as an example in FIG. 22(c) is used. The ontology file indicates the relationship between vocabulary and concepts, and the like. This ontology file states that "IT" and "Information Technology" are the same concept. FIG. 24(b) shows a user profile in which the terms related to the preference information used in the mailer 110b have been translated into the terms used in the car navigation system 110c, using the ontology file. By using the ontology file, it becomes possible for the user profile providing unit 105 to merge user profiles of the different applications.

After converting the terms, the user profile providing unit 105 converts the user profile of the mailer 110b shown in FIG. 24(b) into a format used for the car navigation system 110c. Further, the user profile providing unit 105 merges the user profiles of the web browser and mailer, and provides the merged user profile to the car navigation system 110c.

A user profile can thus be shared among the applications 110 even when the formats of the applications are different.

Other Embodiments

A method in which the management device 100 executes a program recorded on a computer readable recording medium for executing that method is included in the scope of the present invention. Here, examples of recording media include a computer readable/writable flexible disc, a hard disc, semiconductor memory, a CD-ROM, a DVD, a magneto-optic disk (MO), and the like.

Note that the aforementioned embodiments and examples are intended to illustrate the present invention, and the present invention is not limited thereto.

INDUSTRIAL APPLICABILITY

The present invention makes it possible to personalize devices and services by sharing a user profile among a plurality of devices and services that take a user's situation into consideration.

What is claimed is:

1. A management device for collecting user profiles from a user terminal, the management device being connected to the user terminal in which one or more applications operate and create the user profiles, the management device comprising:

a determination criteria storing means for storing one or more user situation determination criteria for determining a user situation;

a collecting means for collecting and storing the user profiles created by the one or more applications;

a request accepting means for accepting a request for a comprehensive user profile from any of the one or more applications;

a user situation managing means for determining, in response to the request for the comprehensive user profile, a current user situation based on the user situation determination criteria;

a creating means for, in response to the request for the comprehensive user profile, extracting, from the user profiles stored in the collecting means, one or more user profiles relating to the current user situation determined by the user situation managing means and creating the comprehensive user profile of the current user situation based on the one or more extracted user profiles relating to the current user situation; and a transmitting means for transmitting the comprehensive user profile created by the creating means to the one or more applications, wherein the user situation managing means further stores a relevance level table that defines a level of relevance between determined user situations, and wherein, in response to the request for the comprehensive user profile, the creating means:

specifies, from the relevance level table, a related user situation other than the current user situation and related to the current user situation;

extracts, from the user profiles stored in the collecting means, one or more user profiles relating to the specified related user situation in addition to the extracted one or more user profiles relating to the current user situation;

weights (i) the extracted one or more user profiles relating to the specified related user situation and (ii) the extracted one or more user profiles relating to the current user situation, based on the level of relevance, indicated by the relevance level table, between the current user situation and the related user situation; and creates the comprehensive user profile based on each of the weighted user profiles.

2. The management device according to claim 1, wherein the user situation managing means farther accepts a registration of the one or more user situation determination criteria.

3. The management device according to claim 1, wherein each time the collecting means collects the user profiles, the user situation managing means determines the user situation at a time of collecting the user profiles based on the one or more user situation determination criteria, and wherein the collecting means correlates the user situation determined by the user situation managing means at the time of collecting the user profiles with the user profiles and stores the user situation correlated with the user profiles.

4. The management device according to claim 1, wherein the user situation managing means correlates a predetermined user situation with predetermined link information and stores the predetermined user situation correlated with the predetermined link information, wherein the collecting means correlates the collected user profiles with the predetermined link information and stores the collected user profiles correlated with the predetermined link information, and wherein the creating means extracts the one or more user profiles using the predetermined link information corresponding to the current user situation as a key, and creates the comprehensive user profile based on the one or more extracted user profiles.

5. The management device according to claim 1, wherein the request accepting means receives, together with the request for the comprehensive user profile, a format of the comprehensive user profile that the any of the one or more applications can interpret, and wherein the creating means transmits the created comprehensive user profile after converting the format of the created comprehensive user profile into the format that the any of the one or more applications can interpret.

6. A management method for collecting user profiles from a user terminal, the management method being executed by a computer that is connected to the user terminal in which one or more applications operate and create the user profiles, the management method comprising:

storing one or more user situation determination criteria for determining a user situation;

collecting and storing the user profiles created by the one or more applications;

storing a relevance level table that defines a level of relevance between determined user situations;

accepting a request for a comprehensive user profile from any of the one or more applications;

determining, in response to the accepted request for the comprehensive user profile, a current user situation based on the user situation determination criteria;

extracting, in response to the accepted request for the comprehensive user profile and from the stored user profiles, one or more user profiles relating to the current user situation determined by said determining;

creating, in response to the accepted request for the comprehensive user profile, the comprehensive user profile of the current user situation based on the one or more extracted user profiles relating to the current situation; and transmitting the created comprehensive user profile to the one or more applications, wherein, in response to the accepted request for the comprehensive user profile, the creating of the comprehensive user profile further includes:

specifying, from the relevance level table, a related user situation other than the current user situation and related to the current user situation;

extracting, from the stored user profiles, one or more user profiles relating to the specified related user situation in addition to the extracted one or more user profiles relating to the current user situation;

weighting (i) the extracted one or more user profiles relating to the specified related user situation and (ii) the extracted one or more user profiles relating to the current user situation, based on the level of relevance, indicated by the relevance level table, between the current user situation and the related user situation; and creating the comprehensive user profile based on each of the weighted user profiles.

7. A computer-readable recording medium having a management program recorded thereon, the management program causing a computer terminal to function as a management device for collecting user profiles from a user terminal in which one or more applications operate and create the user profiles, the management device being connected the user terminal, the management program causing the computer terminal to function as:

a determination criteria storing means for storing one or more user situation determination criteria for determining a user situation;

a collecting means for collecting and storing the user profiles created by the one or more applications;

a request accepting means for accepting a request for a comprehensive user profile from any of the one or more applications;

a user situation managing means for determining, in response to the request for the comprehensive user profile, a current user situation based on the user situation determination criteria;

a creating means for, in response to the request for the comprehensive user profile, extracting, from the user profiles stored in the collecting means, one or more user profiles relating to the current user situation determined by the user situation managing means, and creating the comprehensive user profile of the current user situation based on the one or more extracted user profiles relating to the current user situation; and a transmitting means for transmitting the comprehensive user profile created by the creating means to the one or more applications, wherein the user situation managing means further stores a relevance level table that defines a level of relevance between determined user situations, and wherein, in response to the request for the comprehensive user profile, the creating means:

specifies, from the relevance level table, a related user situation other than the current user situation and related to the current user situation;

extracts, from the user profiles stored in the collecting means, one or more user profiles relating to the specified related user situation in addition to the extracted one or more user profiles relating to the current user situation;

weights (i) the extracted one or more user profiles relating to the specified related user situation and (ii) the extracted one or more user profiles relating to the current user situation, based on the level of relevance, indicated by the relevance level table, between the current user situation and the related user situation; and creates the comprehensive user profile based on each of the weighted user profiles.

* * * * *

UNITED STATES PATENT AND TRADEMARK OFFICE
CERTIFICATE OF CORRECTION

PATENT NO. : 7,650,342 B2  
APPLICATION NO. : 11/628952  
DATED : January 19, 2010  
INVENTOR(S) : Keiji Sugiyama et al.

It is certified that error appears in the above-identified patent and that said Letters Patent is hereby corrected as shown below:

In column 22, claim 2, line 48, "farther" should read --further--.

Signed and Sealed this

Eighth Day of June, 2010

David J. Kappos  
*Director of the United States Patent and Trademark Office*